(12) United States Patent  
Buchmann et al.

(10) Patent No.: US 8,756,273 B2
(45) Date of Patent: Jun. 17, 2014

(54) HANDLING OF CROSS-SYSTEM METADATA IN A SYSTEM LANDSCAPE WITH A HUB AND BACKEND-SYSTEMS

(75) Inventors: Daniel Buchmann, Eggenstein (DE); Florian Kresser, Lobbach (DE); Thomas Finke, Hockenheim (DE); Hans-Martin Ludwig, Sandhausen (DE); Thomas Mueller, Wiesloch (DE)

(73) Assignee: SAP AG, Walldorf (DE)

( * ) Notice: Subject to any disclaimer, the term of this patent is extended or adjusted under 35 U.S.C. 154(b) by 105 days.

(21) Appl. No.: 13/305,720

(22) Filed: Nov. 28, 2011

(65) Prior Publication Data

US 2013/0138719 A1    May 30, 2013

(51) Int. Cl.
 *G06F 15/16*    (2006.01)
(52) U.S. Cl.
 USPC ............................ 709/203; 707/705; 370/400
(58) Field of Classification Search
 USPC .......... 709/203–208, 219, 218, 227; 707/705; 370/400
 See application file for complete search history.

(56) References Cited

U.S. PATENT DOCUMENTS

| | | | |
|---|---|---|---|
| 7,490,141 B1 * | 2/2009 | Cammarata et al. .......... | 709/219 |
| 7,966,383 B2 * | 6/2011 | Cao et al. ....................... | 709/218 |
| 2002/0159400 A1 * | 10/2002 | Park et al. ...................... | 370/282 |
| 2003/0224781 A1 * | 12/2003 | Milford et al. .............. | 455/426.1 |
| 2004/0019732 A1 * | 1/2004 | Overtoom et al. ............ | 710/313 |
| 2005/0268060 A1 * | 12/2005 | Cronin et al. .................. | 711/167 |
| 2006/0026300 A1 * | 2/2006 | Rose .............................. | 709/246 |
| 2006/0028994 A1 * | 2/2006 | Hofmann et al. ............. | 370/252 |
| 2006/0036682 A1 * | 2/2006 | Fletcher et al. ............... | 709/203 |
| 2008/0250115 A1 * | 10/2008 | Iyer ............................... | 709/207 |

\* cited by examiner

*Primary Examiner* — Dustin Nguyen

(74) *Attorney, Agent, or Firm* — Mintz Levin Cohn Ferris Glovsky and Popeo, P.C.

(57) ABSTRACT

A system and method for handling of cross-system metadata in a system landscape with a hub and backend systems is presented. Reference metadata that is associated with a first backend system and that refers to metadata of a second backend system is stored in a storage associated with the first backend system, the storage further separately storing backend system metadata that is associated only with the first backend system. Connecting metadata, which establishes a connection between backend system metadata associated with the first backend system and backend system metadata of any other backend system, is stored separately. At 206, the first backend system is linked to the hub by the connecting metadata from storage associated with the first backend system to a hub storage associated with the hub. The connecting metadata is activated in the hub to link the first backend system with the second backend system.

4 Claims, 2 Drawing Sheets

HANDLING OF CROSS-SYSTEM METADATA IN A SYSTEM LANDSCAPE WITH A HUB AND BACKEND-SYSTEMS

TECHNICAL FIELD

The subject matter described herein relates to handling of versions of metadata, and more particularly to a system and method for handling of cross-system metadata in a system landscape with a hub and backend systems.

BACKGROUND

A backend system, such as a server system for serving one or more business applications, typically provides metadata to describe a set of business data. Metadata can have different versions depending on the set of business data being handled by the backend system.

There are three classes of metadata, when considered from an "owner" point of view: (1) Metadata that is owned by a backend system; (2) metadata that establishes a connection between the metadata of two or more backend systems, and hence is not "owned" by any of the backend systems; and (3) metadata which is owned by one of the backend systems but refers to metadata of another backend system.

However, handling of metadata that is not restricted to a single system, connection, or server, (herein collectively referred to as a "system"), has heretofore not been addressed. For instance, an enterprise resource planning (ERP) and a customer relationship management (CRM) system both have their own metadata for search. When defining a search for a callback scenario, for example, such as "Find all CRM customers who have purchased ERP material 4711," the metadata that is required uses ERP and CRM metadata at the same time. This cross-system metadata has to be delivered, and the versioning thereof has to be handled.

Previously, a hub system had to manage various versions of the backend system. These backend system versions are a separate dimension from the hub releases, which therefore multiply the versions to be handled. Further, the hub has to follow a much higher frequency of delivery in order to satisfy every backend system version. Accordingly, the hub becomes highly dependent of the backend system releases, and vice versa.

Another problem is versioning of metadata in a hub and backend system landscape. While each backend system can automatically upgrade its connecting metadata, connections can still be incomplete. Consider backend system "System A", versions 1.0 and 2.0, and backend system "System B." Initially a connection "A1.0<->B1.0" is established and delivered with the both backend systems. An upgrade of A automatically leads to a new connecting metadata "A2.0<->B1.0", and vice versa, when the new backend system version is linked to the hub system. But the connecting metadata "A2.0<->B2.0" does not emerge automatically.

SUMMARY

This document describes a system and method for handling of cross-system metadata in a system landscape with a hub and backend systems, which avoids disadvantages described above, thus greatly reducing total cost of development and total cost of ownership at the developer, and total cost of ownership at the customer. The system and method provides a solution that is more robust, stable, and lean, and can be used to achieve these advantages, especially in a hub and backend system landscape, and where additional cross-system data (especially metadata) is added.

In one aspect, a method for handling of cross-system metadata in a system landscape with a hub and backend systems is disclosed. The method includes storing, in a storage associated with a first backend system, reference metadata that is associated with the first backend system and that refers to metadata of a second backend system, the storage further separately storing backend system metadata that is associated only with the first backend system. The method further includes storing, in the storage, connecting metadata that establishes a connection between backend system metadata associated with the first backend system and backend system metadata of any other backend system. The method further includes linking the first backend system to the hub, the linking including delivering the connecting metadata from storage associated with the first backend system to a hub storage associated with the hub.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide handling of cross-system metadata in a system landscape with a hub and backend systems.

Figure 1:
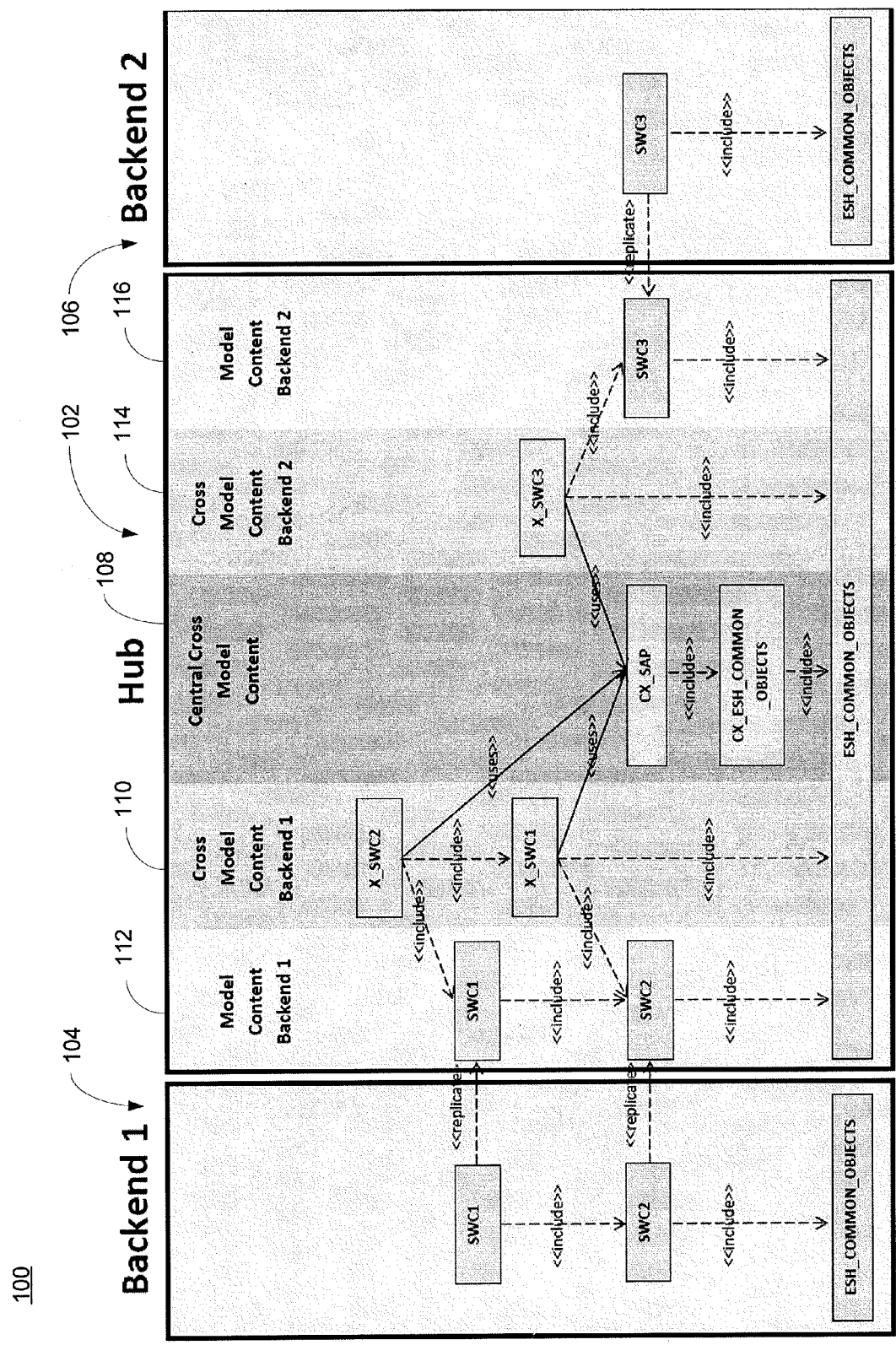
FIG. 1 is a diagram illustrating aspects of a system showing features consistent with implementations of the current subject matter.

FIG. 1 illustrates a system 100 for modeling cross system content between a hub 102 and one or more backend systems, 104 and 106. Consistent with the illustration of FIG. 1, the system 100 provides central cross model content 108, cross model content 110 for a first backend system 104, and model content 112 for the first backend system 104. The system 100 also provides cross model content 114 for a second backend system 106, and model content 116 for the second backend system 106. The system 100 can provide cross model content and model content for any number of backend systems as desirable, and each of the various different contents can be described by its own metadata.

To resume the example described above, the first backend system 104 can be an ERP system, while the second backend system 106 can be a CRM system. The model for the ERP content is owned by the ERP backend system, and analogously is the CRM customer. The connection between the systems is established by a relation between the ERP content and the CRM content; the relation is not direct and belongs neither to ERP nor to CRM. Finally, there is a request definition at the CRM customer (hence owned by CRM) that tells how to operate on the ERP content information, using the relation between ERP and CRM.

Again, three classes of metadata, when considered from an "owner" point of view, include: (1) metadata that is owned by a backend system; (2) metadata that establishes a connection between the metadata of two or more backend systems, and hence is not "owned" by any backend systems; and (3).

Metadata that is owned by one of the backend systems, but which refers to metadata of another backend system, is delivered with the backend system, just like metadata that is owned by a backend system, except that the backend system must be able to cope with the references which are not valid in the context of the stand-alone backend system. For the sake of this difference, classes (1) and (3) are kept separate from each other, subject to the backend system and without impact to the hub system. Class (2) contains connecting metadata of any kind, and therefore a specific connecting metadata element is delivered with each of the participating backend systems. Each backend system, when linked to the hub system, brings this connecting metadata to the hub. The hub system is able to check whether all the relevant partners are linked to the hub system, and only then the connecting metadata becomes active. In the example above, the relation between ERP-material and CRM-product is delivered with either system, but not with an SRM-system.

Figure 2:
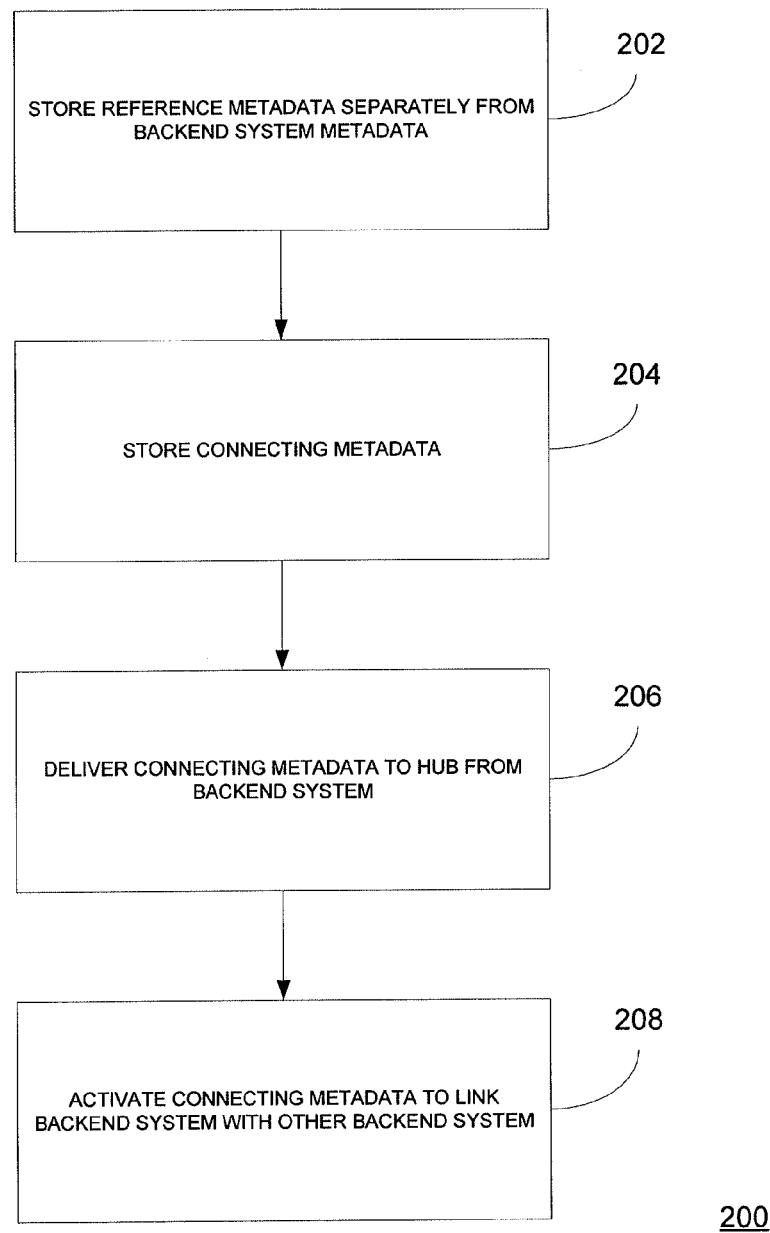
FIG. 2 is a process flow diagram illustrating aspects of a method having one or more features consistent with implementations of the current subject matter.

FIG. 2 is a process flow diagram illustrating aspects of a method 200 for handling of cross-system metadata in a system landscape with a hub and backend systems. At 202, reference metadata that is associated with a first backend system and that refers to metadata of a second backend system is stored in a storage associated with the first backend system, the storage further separately storing backend system metadata that is associated only with the first backend system. At 204, connecting metadata, which establishes a connection between backend system metadata associated with the first backend system and backend system metadata of any other backend system, is stored in the storage, preferably separately from the reference metadata.

At 206, the first backend system is linked to the hub, in which the linking includes delivering the connecting metadata from storage associated with the first backend system to a hub storage associated with the hub. Finally, at 208 the connecting metadata is activated in the hub, in order to link the first backend system with the second backend system and any other backend system based on the reference metadata and the connecting metadata, respectively.

An alternative solution is to not work with indirect connecting metadata, but with directed connecting metadata. On one hand, the connecting metadata belongs to a distinct system (and is therefore delivered only by one system); on the other hand, this creates redundant data, because in the end connecting metadata is required in both directions (apart from rare exceptions).

For versioning, instead of manual maintenance or other complicated mechanisms, the connecting metadata is kept version-independent by definition, such as "A<->B". This can be realized leveraging the automatically upgrade of connecting metadata, where, as the key of an entity remains static across all versions, the connecting metadata can use these static keys and ignore the respective version. The hub system is still able to recognize the distinct versions of the abstract entity so that the connecting metadata can be applied correctly at a later point in time.

A variation of this solution is to define a starting version for a connecting metadata element. The hub system generates or writes a version graph, and based on this version graph a minimal version for a connecting metadata element can be specified by a user. The version graph can either be derived automatically, for instance based on release counters (the simplest variant is the rule "higher version counter=>newer version"), or it can be maintained by a user. Likewise, a maximum release can be indicated.

Metadata of class (2) includes references based on connections. In order to keep the references independent of versions, too, starting from the connecting metadata itself, all further information contained in the reference has also to use the static, version-independent keys of an entity. Only when applying the model to a concrete set of backend systems, the respective versions are evaluated, and the model is applied.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for handling of cross-system metadata in a system landscape with a hub and backend systems, the method comprising:
    storing, by one or more data processors in a storage associated with a first backend system, reference metadata that is associated with the first backend system and that refers to metadata of a second backend system, the first backend system being an enterprise resource planning system, the second backend system being a customer relationship management system, the storage further separately storing backend system metadata that is associated only with the first backend system;
    storing, by one or more data processors in the storage, connecting metadata that establishes a connection between backend system metadata associated with the first backend system and backend system metadata of any other backend system;
    linking, by one or more data processors, the first backend system to the hub, the linking including delivering the connecting metadata from storage associated with the first backend system to a hub storage associated with the hub; and
    activating, by one or more data processors, the connecting metadata in the hub to link the first backend system with the second backend system and any other backend system based on the reference metadata and the connecting metadata, respectively.

2. A computer program product comprising a non-transitory, machine-readable medium storing instructions that, when executed by at least one programmable processor, cause the at least one programmable processor to perform operations comprising:
    storing reference metadata that is associated with a first backend system and that refers to metadata of a second backend system, the first backend system being an enterprise resource planning system, the second backend system being a customer relationship management system, the storage further separately storing backend system metadata that is associated only with the first backend system;
    storing connecting metadata that establishes a connection between backend system metadata associated with the first backend system and backend system metadata of any other backend system;
    linking the first backend system to a hub, including delivering the connecting metadata from storage associated with the first backend system to a hub storage associated with the hub; and
    activating the connecting metadata in the hub to link the first backend system with the second backend system and any other backend system based on the reference metadata and the connecting metadata, respectively.

3. A system comprising:
    at least one programmable processor; and a non-transitory machine-readable medium storing instructions that, when executed by the at least one processor, cause the at least one programmable processor to perform operations comprising:
    storing reference metadata that is associated with a first backend system and that refers to metadata of a second backend system, the first backend system comprising an enterprise resource planning system, the second backend system comprising a customer relationship management system, the storage further separately storing backend system metadata that is associated only with the first backend system;
    storing connecting metadata that establishes a connection between backend system metadata associated with the first backend system and backend system metadata of any other backend system;
    linking the first backend system to the hub, including delivering the connecting metadata from storage associated with the first backend system to a hub storage associated with the hub; and activating the connecting metadata in the hub to link the first backend system with the second backend system and any other backend system based on the reference metadata and the connecting metadata, respectively.

4. The method in accordance with claim 1, wherein metadata associated with each of the hub, the enterprise resource planning system, and the customer relationship management system is updated separately so that the hub, the enterprise resource planning system, and the customer relationship management system simultaneously support separate versions of corresponding metadata.

\* \* \* \* \*